Patented Sept. 23, 1924.

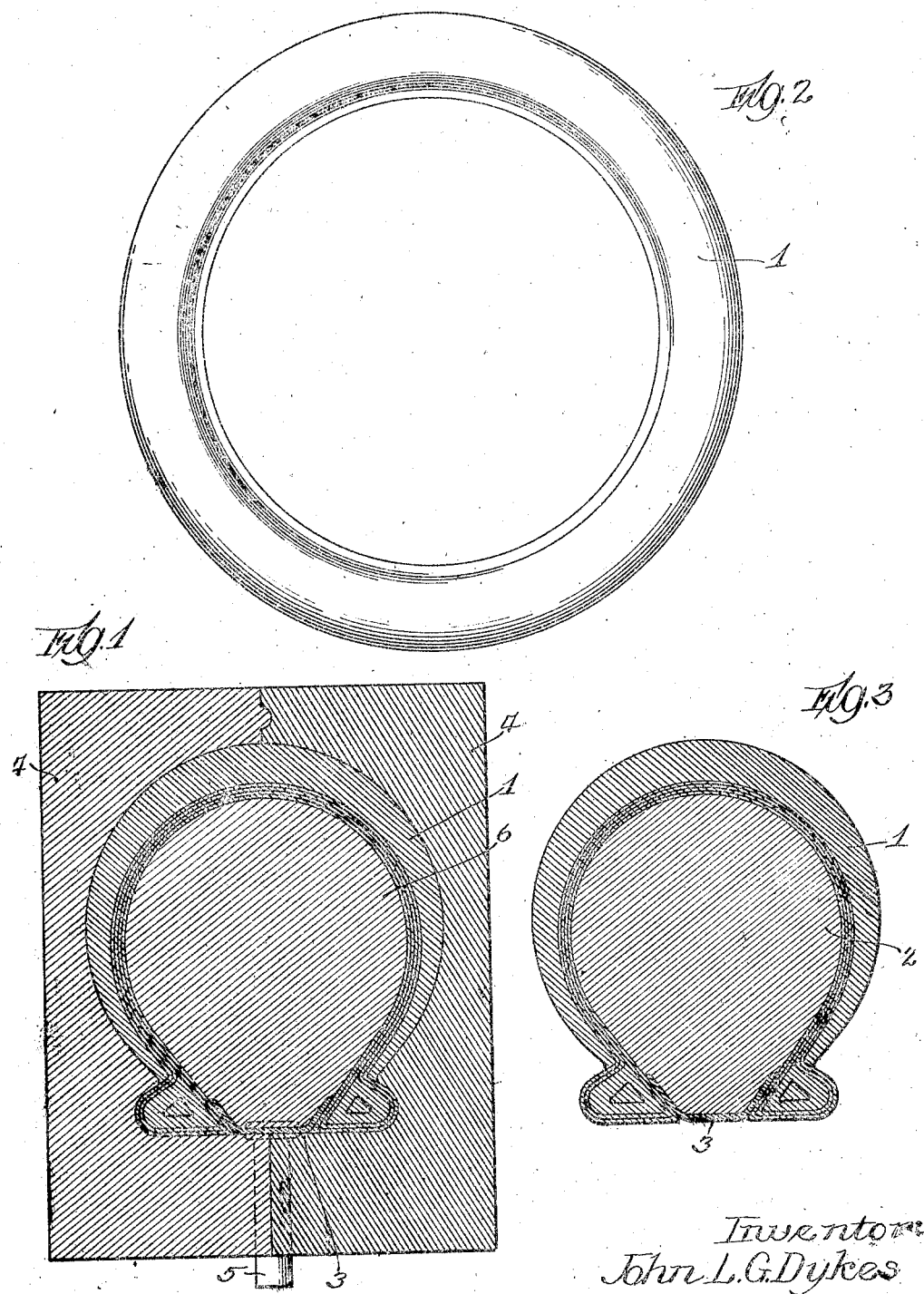

1,509,346

UNITED STATES PATENT OFFICE.

JOHN L. G. DYKES, OF CHICAGO, ILLINOIS.

METHOD AND APPARATUS FOR MAKING PNEUMATIC TIRES.

Application filed June 24, 1922. Serial No. 570,697.

*To all whom it may concern:*

Be it known that I, JOHN L. G. DYKES, a citizen of the United States, and resident of Chicago, Cook County, Illinois, have invented a certain new and useful Improvement in Methods and Apparatus for Making Pneumatic Tires, of which the following is a specification.

This invention relates to the manufacture of pneumatic tires and more particularly to the manufacture of the casings for pneumatic tires in which inflatable inner tubes are employed.

Generally stated, the object of the invention is to provide a novel method and form of apparatus for making pneumatic tire casings by first building the raw carcass of the tire complete, in tire form, and then placing it in a vulcanizing mold, and then introducing gypsum or plaster of Paris or some other plastic or liquid or semi-liquid material into the tire casing, which will quickly set and harden, thereby to form a hard core or mandrel upon which the tire casing may be vulcanized under pressure, the said casing having been first preferably stretched to a larger diameter by the introduction of said material, whereby the tire casing is vulcanized while thus maintained under pressure and in stretched condition.

To the foregoing and other useful ends the invention consists in matters hereinafter set forth and claimed and shown in the accompanying drawings in which—

Figure 1 is a cross section of a vulcanizing mold with a pneumatic tire casing therein, showing a solid core or mandrel in the tire, in cross section, involving the principles of the invention.

Figure 2 is a side elevation, on a smaller scale, of the complete or finished tire casing.

Figure 3 is a cross section of the completed raw carcass of the tire casing, showing in cross section the mandrel or core upon which it was built or constructed, and from which core or mandrel the raw carcass is then removed and placed in a vulcanizing mold.

As thus illustrated, the pneumatic tire casing 1 may be built or constructed in any suitable or desired manner, as by superposing the requisite number of plies of fabric or rubber, or rubberized fabric, and by adding the tread rubber and other materials therein for the building of a tire for automobiles or other motor vehicles. This, it will be understood, is all done on a metal core or mandrel 2, which latter is or may be merely an annular metal ring, similar to those ordinarily employed for this purpose, and of less size than that desired for the ultimate tire casing. Preferably the flap 3 is provided and attached across the base of the tire casing in the usual or any suitable manner.

The raw carcass of the tire casing is then removed from the mandrel 2 and placed in the mold 4, which latter may be of any suitable, known or approved character, being provided with steam connections for heating the mold to the required temperature to vulcanize the rubber of the tire casing. After the raw carcass 1 is in place in the mold, a quantity of freshly mixed plaster of Paris or gypsum or any other similar material, in plastic or liquid or semi-liquid condition, is then forced through the tube 5 into the interior of the tire casing, under sufficient pressure to expand the tire casing into firm contact with the inner surface of the mold. Thus the fabric or cords or other fibrous material of the tire casing is stretched somewhat, and the tire casing is then of the size desired for the ultimate product. The plaster of Paris or other similar materials will then quickly set and become hard, so that a hard and non-yielding core or mandrel 6 is formed and produced within the tire casing. There is some expansion of the plaster of Paris or other similar materials, of course, which serves a useful purpose, as this serves to ensure the vulcanization of the tire casing in the desired manner. After the tire casing is vulcanized, the whole thing is then taken out, and a few taps of a hammer on the outside of the tire casing will be sufficient to break up the perishable core or mandrel inside, so that this core or mandrel will be removed in broken pieces from the interior of the tire casing. The broken core or mandrel can then be ground up and used over again with a certain percentage of fresh plaster of Paris, to form other cores or mandrels in the same manner.

It will be seen that advantages result from the use of this method, and from the use of apparatus involving a temporary or perishable core or mandrel of a hard and unyielding character. For example, in the stretching of tire casings within a mold by the use of compressed air or steam or even water, leakage must be guarded against, and internal pressure must be maintained. This is not so with a temporary or perishable core or mandrel formed from a liquid or plastic or semi-liquid material which quickly obtains a set and becomes hard and absolutely non-yielding in character, such as the one shown and described. After the core becomes hard and well set, there can be no leakage, even if the base of the tire is not tightly sealed by the flap 3, or by some other means. The cost of the temporary core or mandrel thus employed, for each tire casing, is comparatively slight, and the apparatus for making the tire casings may easily include some mixing and pumping apparatus (not shown) for forcing the wet mixture of plaster of Paris, in the proper consistency, through the tube 5 and into the interior of the tire casing, thereby to expand the latter and hold it in expanded condition without any danger of the stretching or expansion being relaxed during the vulcanizing operation. Thus the tire is built on an undersize mandrel 2, or in any other suitable manner, and then expanded to a larger diameter by the introduction therein of the wet plaster of Paris mixture, or by a mixture of any other materials that will harden and form a hard and non-yielding core or mandrel upon which the casing may be vulcanized in the desired manner. Any cementitious or suitable material may be used for the production of the core or mandrel 6, and it will be seen that the method involves the use of the raw carcass of the tire casing as a mold in which to form this temporary or perishable mandrel, in the manner explained. The core or mandrel 6, of course, does not become soft when subjected to the temperature necessary for the vulcanizing of the tire casing, but becomes harder and more firm if anything, for the heat serves to hasten the setting action of the plaster of Paris or other material, so that the core or mandrel thus formed is very soon reduced to an absolutely non-yielding and non-compressible condition, whereby the pressure by which the plastic mass or flowing means was forced in can be relaxed without relaxing the expansion or stretching of the tire casing, and the latter is maintained in this condition during the vulcanization thereof.

By the expression "plaster of Paris" is meant, of course, the commodity commonly known in the trade or market by that name, or any similar substance which will act in a similar manner, or which can be used in the manner shown and described. The amount of water or other liquid to be mixed with said substance, to produce a mixture which can be introduced into the pneumatic tire casing in the form of a flowing means, will depend upon circumstances, of course, and may be varied to suit the requirements, the essential being that the mixture be fluid enough to permit of its being pumped or forced through a tube into the interior of the tire, and that it then be capable of setting and hardening quickly enough to avoid objectionably delaying the vulcanization of the tire. The temporary mandrel or temporary filling thus produced is not like liquid or gas, and is not like a bag or inner tube, and is unlike some other things which have been used for this purpose, inasmuch as the plaster of Paris or other substance will set and become hard and thus produce a core or mandrel which does not and can not contract, which is non-yielding, which will not melt or become injured or changed in any way by the heat necessary for vulcanizing the tire and which does not require the maintaining of the external pumping or other pressure by which it was forced into the tire. Obviously, after the plaster of Paris or other material has hardened and become set, it does not require any watching, and there need be no anxiety regarding the maintaining of the tire casing in stretched and expanded condition during the vulcanizing operation.

The particular article of manufacture shown and described is a pneumatic tire, but it is obvious, of course, that the process or method may be employed for the production of articles for other purposes, or of any suitable or desired character.

What I claim as my invention is—

1. A method for making pneumatic tire casings, comprising the building of the raw carcass complete in tire form, forcing a flowing means under pressure into the interior of the tire casing to form a non-compressible and non-yielding core or mandrel, vulcanizing the tire casing on this core or mandrel, and then removing the core or mandrel from the interior of the casing.

2. A process as specified in claim 1, said flowing means being a mixture of cementitious material which is adapted to set very rapidly and become hard after entering the tire casing.

3. A process as specified in claim 1, said flowing means comprising a plaster of Paris mixture of the proper consistency to flow under pressure into the casing and therein become hard and non-yielding during the vulcanizing operation.

4. A process as specified in claim 1, said flowing means being forced under sufficient pressure to expand and stretch the raw tire carcass to a larger diameter or size preliminary to the vulcanization thereof while thus maintained in stretched and expanded condition.

5. A process as specified in claim 1, said core or mandrel being a temporary and perishable one and the removal thereof from the interior of the tire casing being accomplished by impacts or pressure on the outside of the tire casing to break the core or mandrel into portions which may be conveniently and easily taken out of the tire.

6. Apparatus for making pneumatic tire casings, comprising a vulcanizing mold to receive the raw carcass complete in tire form, and a hard and non-yielding core or mandrel for use in the tire casing during the vulcanization thereof, said core or mandrel being formed in the tire casing from a plastic and cementitious material, whereby said core or mandrel is adapted to be broken to facilitate its removal from the tire.

7. Apparatus as specified in claim 6, said core or mandrel being formed from plaster of Paris, substantially as described.

8. Apparatus as specified in claim 6, said core or mandrel being of a size to stretch and expand the raw carcass of the tire casing to a larger diameter or size preliminary to the vulcanization thereof.

9. A method for making pneumatic tire casings, comprising the building of the raw carcass of the tire casing complete in tire form, then holding the raw carcass in stretched and expanded condition on a hard and non-yielding core or mandrel, by forming the core or mandrel from a suitable substance or mixture which will set and harden within the tire casing, thereby using the raw carcass as a mold to form the core or mandrel, and then vulcanizing the tire casing on said core or mandrel, and removing the mandrel from the vulcanized tire.

10. A method for making pneumatic tire casings, comprising the use of the raw carcass of the tire casing as a mold in which to form a non-yielding and non-compressible core or mandrel which will remain hard and non-yielding during the vulcanizing operation which follows the formation of the said core or mandrel within the tire casing.

11. A method as specified in claim 10, the formation of said core or mandrel as stated being produced under pressure sufficient to expand and stretch the tire casing to a larger diameter or size preliminary to the vulcanization thereof.

12. A method for making rubber articles, comprising the building of the raw carcass complete in the desired form, forcing a flowing means under pressure into the interior of the article to form a non-compressible and non-yielding support, vulcanizing the article on this support, and then removing the support from the interior of the article.

13. Apparatus for making rubber articles, comprising means whereon to build the raw carcass complete in the desired form, a vulcanizing mold, and a hard and non-yielding support which is on larger size than said building means and adapted for use in the article during the vulcanization thereof, said support being formed in the article from a plastic and cementitious material.

14. A method for making rubber articles, comprising the building of the raw carcass of the article complete in the desired form, then holding the raw carcass in stretched and expanded condition on a hard and non-yielding support, by forming the support from a suitable substance or mixture which will set and harden within the article, thereby using the raw carcass as a mold to form the support, thereafter vulcanizing the article on said support, and removing the support from the vulcanized article.

15. A method for making rubber articles, comprising the use of the raw carcass of the article as a mold in which to form a non-yielding and non-compressible support which will remain hard and non-yielding during the vulcanizing operation which is subsequent to the formation of the said support within the article.

JOHN L. G. DYKES.